United States Patent
Schreiner

(10) Patent No.: US 10,919,568 B2
(45) Date of Patent: Feb. 16, 2021

(54) METHOD FOR OPERATING A STEERING SYSTEM OF A MOTOR VEHICLE

(71) Applicant: Robert Bosch Automotive Steering GmbH, Schwäbisch Gmünd (DE)

(72) Inventor: Philipp Schreiner, Marpingen (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 174 days.

(21) Appl. No.: 15/763,391

(22) PCT Filed: Sep. 12, 2016

(86) PCT No.: PCT/EP2016/071398
§ 371 (c)(1),
(2) Date: Mar. 26, 2018

(87) PCT Pub. No.: WO2017/060042
PCT Pub. Date: Apr. 13, 2017

(65) Prior Publication Data
US 2018/0281846 A1    Oct. 4, 2018

(30) Foreign Application Priority Data
Oct. 6, 2015 (DE) .......... 10 2015 116 937

(51) Int. Cl.
*B62D 5/04* (2006.01)

(52) U.S. Cl.
CPC ............ *B62D 5/0484* (2013.01); *B62D 5/04* (2013.01); *B62D 5/0403* (2013.01); *B62D 5/046* (2013.01);
(Continued)

(58) Field of Classification Search
CPC .... B62D 5/0481; B62D 5/0484; B62D 5/046; B62D 5/04; B62D 5/0463; B62D 5/0403;
(Continued)

(56) References Cited

U.S. PATENT DOCUMENTS 5,828,972 A * 10/1998 Asanuma et al. ..... B62D 5/006
701/41
6,041,884 A * 3/2000 Shimizu et al. ..... B62D 5/0484
701/41
(Continued)

FOREIGN PATENT DOCUMENTS

DE    198 34 870 A1    2/2000
DE    101 57 666 A1    6/2003
(Continued)

OTHER PUBLICATIONS

International Search Report corresponding to PCT Application No. PCT/EP2016/071398, dated Dec. 14, 2016 (German and English language document) (5 pages).

*Primary Examiner* — Dale W Hilgendorf
(74) *Attorney, Agent, or Firm* — Maginot, Moore & Beck LLP

(57) ABSTRACT

A method for operating a steering system of a motor vehicle with a power steering system including a number of actuator paths for applying a total assist torque to a steering gearbox includes determining the total assist torque in each of the actuator paths. The method further includes determining partial assist torques for all actuator paths in each of the actuator paths. The method further includes receiving the associated partial assist torque by each of the actuator paths from the actuator path that is activated as a master.

6 Claims, 6 Drawing Sheets

(52) U.S. Cl.
CPC .......... *B62D 5/0463* (2013.01); *B62D 5/0409* (2013.01); *B62D 5/0418* (2013.01); *B62D 5/0421* (2013.01); *B62D 5/0481* (2013.01)

(58) Field of Classification Search
CPC ... B62D 5/0409; B62D 5/0418; B62D 5/0421
See application file for complete search history.

(56) References Cited

U.S. PATENT DOCUMENTS

| | | | | |
|---|---|---|---|---|
| 6,394,218 | B1 * | 5/2002 | Heitzer | B62D 5/003 180/402 |
| 6,776,252 | B1 * | 8/2004 | Andonian | B62D 5/001 180/402 |
| 7,130,728 | B2 * | 10/2006 | Suzuki | B62D 5/0484 701/41 |
| 7,290,638 | B2 * | 11/2007 | Shiino et al. | B62D 5/04 180/444 |
| 7,433,767 | B2 * | 10/2008 | Takeuchi | B62D 5/003 180/443 |
| 7,500,537 | B2 * | 3/2009 | Itoh | B62D 5/003 180/402 |
| 7,837,004 | B2 * | 11/2010 | Yasuda | B62D 5/0484 180/446 |
| 10,435,073 | B2 * | 10/2019 | Beer | B62D 5/0463 |
| 2004/0100221 | A1 * | 5/2004 | Fu | H02P 25/03 318/700 |
| 2004/0128042 | A1 | 7/2004 | Takahashi et al. | |
| 2005/0257992 | A1 | 11/2005 | Shiino et al. | |
| 2008/0011537 | A1 * | 1/2008 | Ozsoylu | B62D 5/0424 180/422 |
| 2010/0042295 | A1 * | 2/2010 | Shibata et al. | B62D 5/04 701/41 |
| 2010/0152971 | A1 * | 6/2010 | Shiino et al. | B62D 5/0463 701/41 |
| 2011/0315469 | A1 * | 12/2011 | Uryu | B62D 5/0463 180/443 |
| 2015/0134199 | A1 | 5/2015 | Fraser-Chanpong et al. | |
| 2015/0298722 | A1 * | 10/2015 | Witte | B62D 5/04 180/407 |
| 2015/0314804 | A1 * | 11/2015 | Aoki et al. | B62D 5/0484 701/43 |
| 2015/0360715 | A1 * | 12/2015 | Shimizu | F16D 27/00 701/43 |
| 2018/0086379 | A1 * | 3/2018 | Beer | B62D 5/0463 |

FOREIGN PATENT DOCUMENTS

| | | |
|---|---|---|
| DE | 10 2012 101 006 A1 | 8/2013 |
| EP | 1 375 300 A2 | 1/2004 |
| KR | 10-0892362 B1 | 4/2009 |

* cited by examiner

METHOD FOR OPERATING A STEERING SYSTEM OF A MOTOR VEHICLE

This application is a 35 U.S.C. § 371 National Stage Application of PCT/EP2016/071398, filed on Sep. 12, 2016, which claims the benefit of priority to Serial No. DE 10 2015 116 937.1, filed on Oct. 6, 2015 in Germany, the disclosures of which are incorporated herein by reference in their entirety.

BACKGROUND

The disclosure concerns a method for operating a steering system of a motor vehicle as disclosed herein.

An electromechanical power steering system that is suitable for emergency operation is known from DE 10 2012 101 006 A1. In this case, power electronics comprise at least two power electronic units that carry out the same function. An electrically driven actuator comprises at least two actuator units that carry out the same function. Each actuator unit is connected to one of the two power electronics units.

SUMMARY

It is therefore the object of the disclosure to increase the fault tolerance of an at least partly redundant steering system.

The object of the disclosure is achieved by a method and by a steering system as disclosed herein. Advantageous developments are specified in the subordinate claims. Important features of the disclosure are to be found in the subsequent description and in the drawings, wherein the features can be important for the disclosure both on their own and in different combinations, without this being explicitly mentioned again.

A power steering system of the steering system comprises a number of actuators for applying a total assist torque to a steering gearbox. The total assist torque is determined in each actuator path. Partial assist torques for all actuator paths are determined in each actuator path. Each actuator path receives the associated partial assist torque thereof from an actuator path that is activated as a master actuator path. The redundancy of the calculation is produced by the calculation of the individual assist torques in each actuator path. By taking the partial assist torques from the actuator path activated as a master actuator path, it is ensured that the partial assist torques originate from the master actuator path, i.e. from a single actuator path. The fault tolerance is increased thereby, whereby the probability of a total failure is reduced and thus the steering system can also be used for highly autonomous steering strategies, with which direct intervention of the driver of the vehicle is not always ensured. Overall, the full availability of the steering system is ensured by the centralized determination of the partial assist torques.

In an advantageous embodiment, a fault related to a component that is required for the determination of the partial assist torques is determined in the actuator path that is activated as the master. The actuator path that is activated as the master is activated as a slave when the fault is present. An actuator path previously activated as a slave is activated as the master when the fault is present. Advantageously, as a result the roles as the master and slave of the at least two actuator paths are exchanged, whereby the partial assist torques are essentially available without interruption for downstream functions for applying the partial assist torques to the steering gearbox. Therefore, a changeover process advantageously results that increases the overall availability of the steering system. Moreover, downstream functions in the path affected by the fault continue to be operated.

In an advantageous embodiment, a fault relating to a component that is necessary for applying the partial assist torque to the steering gearbox is determined in an actuator path. The fault is taken into account during the determination of the partial assist torques. Advantageously, a detected fault thus directly affects the determination of the partial assist torques, whereby it can be ensured that the total assist torque is applied to the steering gearbox.

In an advantageous development, the partial assist torque for the actuator path in which the fault has occurred is determined as zero if the fault includes a failure of the component. Advantageously, as a result other actuator paths can take over the function of the actuator path affected by the fault.

In an advantageous development, the partial assist torque for the actuator path in which the fault has occurred is reduced if the fault includes reduced capacity of the actuator path. Advantageously, it can be decided how the partial assist torques are distributed to the available actuator paths as a result of external influences, such as for example temperature or a voltage dropout of the vehicle electrical system occurring in relation to an actuator path.

In an advantageous development, a partial assist torque of a further actuator is increased for compensation of the reduction of the partial assist torque of the actuator path affected by the fault. As a result of said compensation, it is advantageously achieved that the full performance can always be provided by the steering system in the form of the total assist torque.

BRIEF DESCRIPTION OF THE DRAWINGS

Further features, possible applications and advantages of the disclosure arise from the subsequent description of exemplary embodiments of the disclosure that are represented in the figures and the drawing. The same reference characters are used for functionally equivalent variables and features in all figures, even for different embodiments. In the drawing.

DETAILED DESCRIPTION

Figure 1:
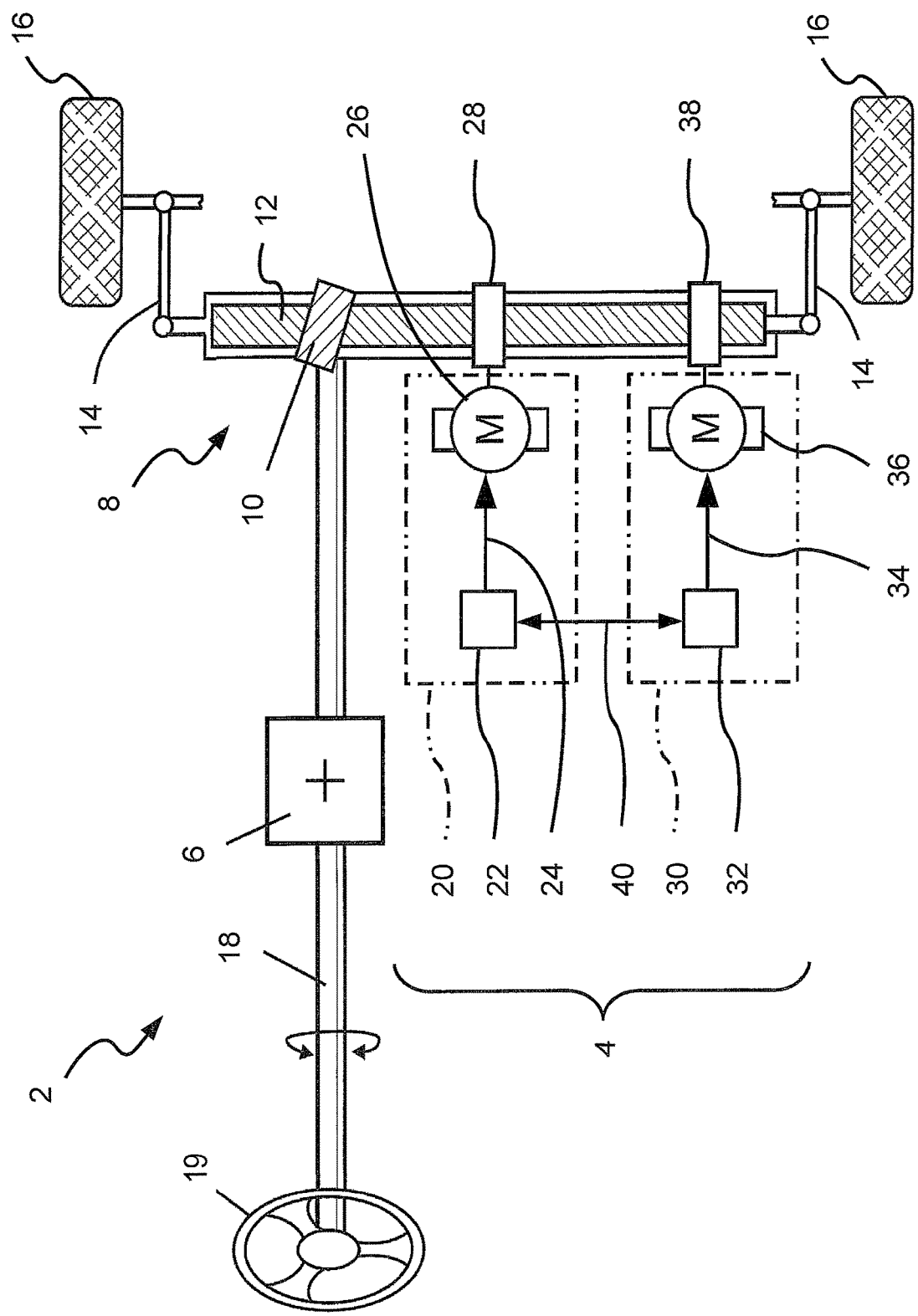
FIG. 1 shows a steering system in schematic form.

FIG. 1 shows in schematic form a steering system 2 and a power steering system 4. Furthermore, the steering system 2 can also comprise a superimposed steering system 6. The steering system 2 comprises a steering gearbox 8, which for example is embodied as a rack and pinion steering gear. Likewise, the steering gearbox 8 can also be embodied as a recirculating ball gear or a ball nut gear. In this description, rack and pinion steering is primarily assumed. The steering gearbox 8 is connected via a pinion 10 and a rack 12 to each side of the vehicle with a steering linkage 14, each of which interacts with a wheel 16. In principle, the steering system 2 in FIG. 1 is one of a number of possible embodiments of suitable devices for performing the method according to the disclosure. Other embodiments can for example be implemented by means of other steering gearboxes or another arrangement of drives. Further, sensors can be disposed in the steering system 2, the arrangement and embodiment of which will not be discussed at this point.

A steering means 19, for example a steering wheel, is disposed on a torsion rod 18. The angle of the steering means applied by the driver of the vehicle can be increased or reduced at the steering gearbox 8 by means of the superimposed steering system 6. Said steering means difference, which is applied by the superimposed steering system 6 to the steering gearbox 8, is also referred to as an additional steering angle. Of course, instead of the torsion rod 18, a steering column can also be disposed between the steering means 19 and the superimposed steering system 6. In said embodiment, the torsion rod 18 is disposed between the superimposed steering system 6 and the power steering system 4 or the steering gearbox 8.

The power steering system 4 comprises at least two actuator paths 20 and 30. Of course, more than two actuator paths can also be present. The actuator paths 20 and 30 are essentially of the same design and each comprises a functional unit 22, 32, each of which transmits a signal 24, 34 to power electronics of an electric motor 26, 36 in order to commonly apply a desired total steering torque to the steering gearbox 8 via a gearbox 28, 38 and the rack 12.

The functional units 22 and 32 are connected to each other via a communication channel 40 for the exchange of signals. The functional units 22 and 32 for the determination of the respective signals 24 and 34 can for example each be implemented on a separate control unit, wherein the control unit comprises a digital computing unit that is connected via a data line to a memory medium. The methods described here can be implemented on the digital computing unit. The steps of the method to be implemented on the digital computing unit are stored as an executable computer program on the memory medium. Of course, the functional units 22 and 32 can also be implemented on a common control unit, wherein preferably the functional units 22 and 32 are implemented on separate processor cores. Therefore, mixed forms are also conceivable, with which for example a higher-level control unit coordinates two lower-level, redundantly implemented control units, each of which comprises one of the functional units 22 and 32.

Figure 2:
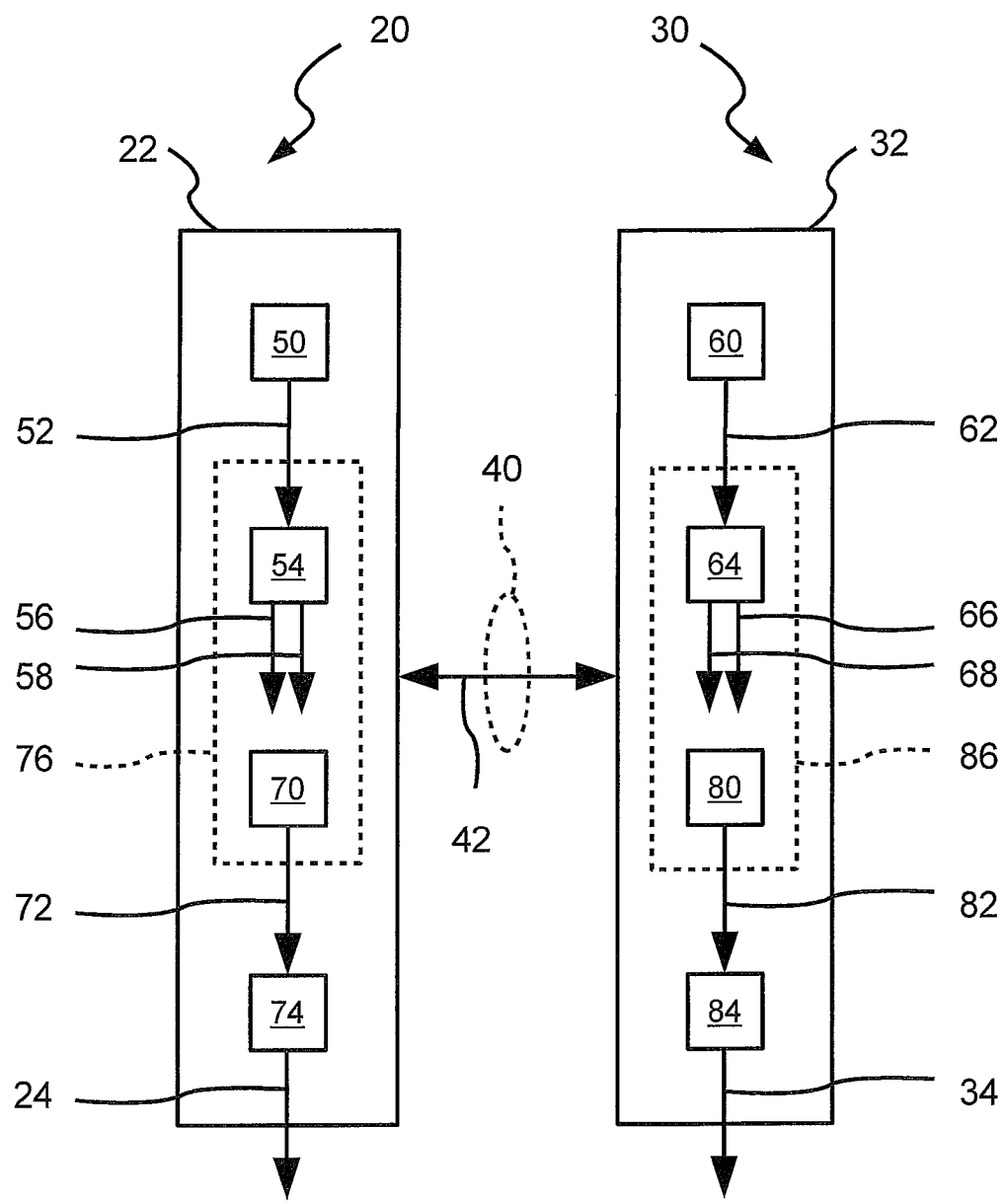
FIGS. 2 through 6 each show two functional units of different actuator paths in schematic form.

In FIG. 2, the structure of the functional units 22 and 32 is shown in schematic form. The functional units 22 and 32 of the actuator paths 20 and 30 are essentially of the same structure and each comprises a first component 50, 60 for the determination of the total assist torque 52, 62, and a second component 54, 64, which is designed for the determination of a first partial assist torque 56, 66 and a second partial assist torque 58, 68, in each case depending on the total assist torque 52, 62. The functional units 22 and 32 each comprise a third component 70, 80 that is embodied to select one of the partial assist torques 56, 58, 66, 68 and to transmit a selected partial assist torque 72, 82 to a fourth component 74, 84. The respective fourth component 74, 84 determines the signal 24, 34 depending on the delivered selected partial assist torque 72, 82.

The first components 50 and 60 can also be referred to as high-level components and comprise for example functions such as angle control or steering control. The fourth components 74 and 84 can also be referred to as low-level components and comprises hardware-related software components, for example engine control and driver software components.

The second component 54, 64 determines in each case a first partial assist torque 56, 66 for the first actuator path 20 and a second partial assist torque 58, 68 for the second actuator path 30 depending on the delivered total assist torque 52, 62 and possibly depending on further signals. The third component 70, 80 is embodied to select or change over between the partial assist torques and to forward the selected partial assist torque 72, 82. The components 54 and 70 and the components 64 and 80 can each be referred to as distributor units 76 or 86. Signals 42 can be exchanged between the functional units 22 and 32 via the communications channel 40.

Figure 3:
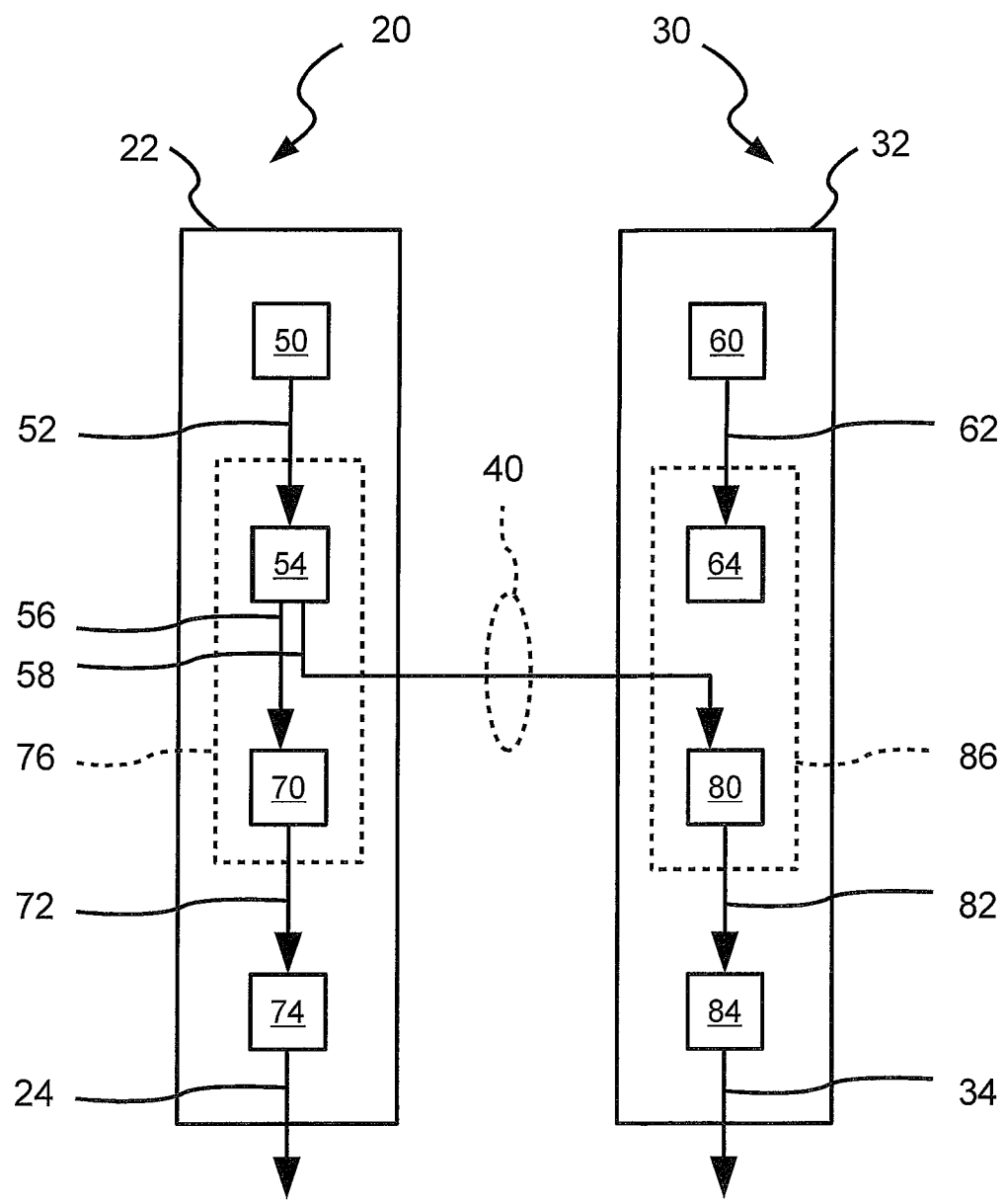

FIG. 3 shows the functional units 22, 32 in a master-slave mode. In the present case, the distributor units 76 and hence the actuator path 20 are activated as the master. The functional unit 22 is thus concerned with the partial assist torque 56 of the second component 54 associated therewith. The third component 70 thus passes the first partial assist torque 56 as the selected partial assist torque 72 to the fourth component 74 in order to apply the selected partial assist torque 72 to the steering gearbox 8 in the form of the partial assist torque 56 by means of the signal 24. The functional unit 32 of the actuator path 30 is activated as a slave and receives the second partial assist torque 58 associated therewith from the second component 54 via the combination channel 40. The third component 80 of the second functional unit 32 passes the second partial assist torque 58 as the selected partial assist torque 82 to the fourth component 84 for generation of the signal 34 in order to apply the second partial assist torque 58 to the steering gearbox 8 by means of the electric motor 36.

The functional unit 32 is activated as a slave and in said state also determines the total assist torque 62 and forwards the same to the second component 64, wherein the second component 64 also determines the partial assist torques 66 and 68 in a form that is not shown, but which are not used for generation of the signals 24 and 34 in the state shown. Therefore, the actuator path 20 is activated as the master and the second actuator path 30 is activated as a slave, wherein the second actuator path 30 in relation to the selected partial assist torque 82 is based on the second partial assist torque 58 from the first actuator path 20.

Figure 4:
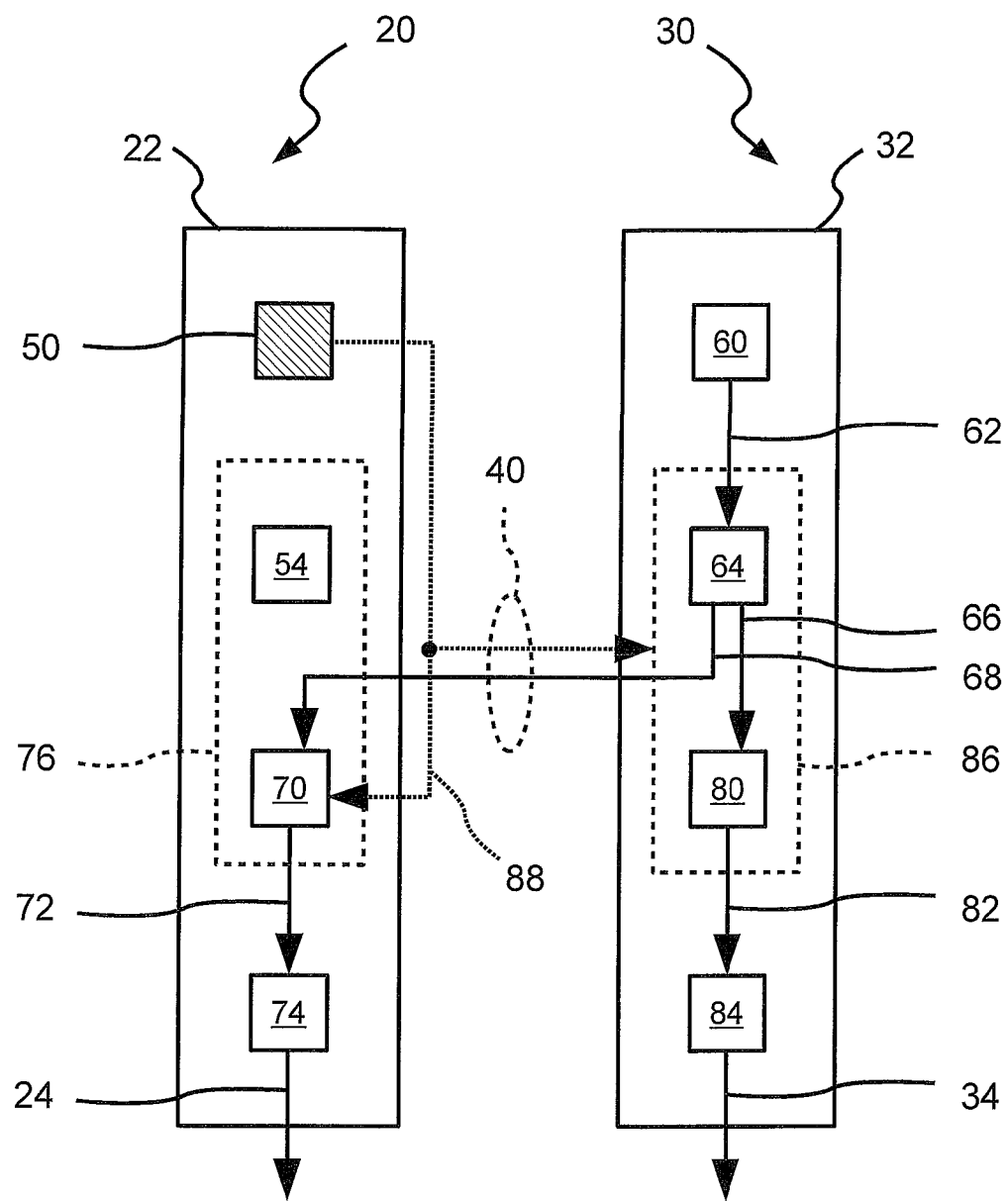

In FIG. 4, the functional units 22 and 32 are shown in schematic form. In contrast to FIG. 3, FIG. 4 shows how the component 50 has a fault 88. The fault 88 comprises a defect of the first component 50, so that the first component 50 does not produce the total assist torque 52 or only in a defective form. As a result of the fault 88, the distributor unit 76 that was previously activated as the master is activated as a slave. Furthermore, the distributor unit 86 previously activated as a slave is activated as the master. Therefore, activation of the functional unit 32 and hence of the second actuator path 30 as the master takes place. Furthermore, activation of the distributor unit 76 and hence of the functional unit 22 and hence of the first actuator path 20 as a slave takes place.

Activated as a slave, the third component 70 of the first functional unit 22 passes the first partial assist torque 66 as the selected partial assist torque 72 to the fourth component 74. Activated as the master, the third component 80 passes the second partial assist torque 68 as the selected partial assist torque 82 to the fourth component 84.

Figure 5:
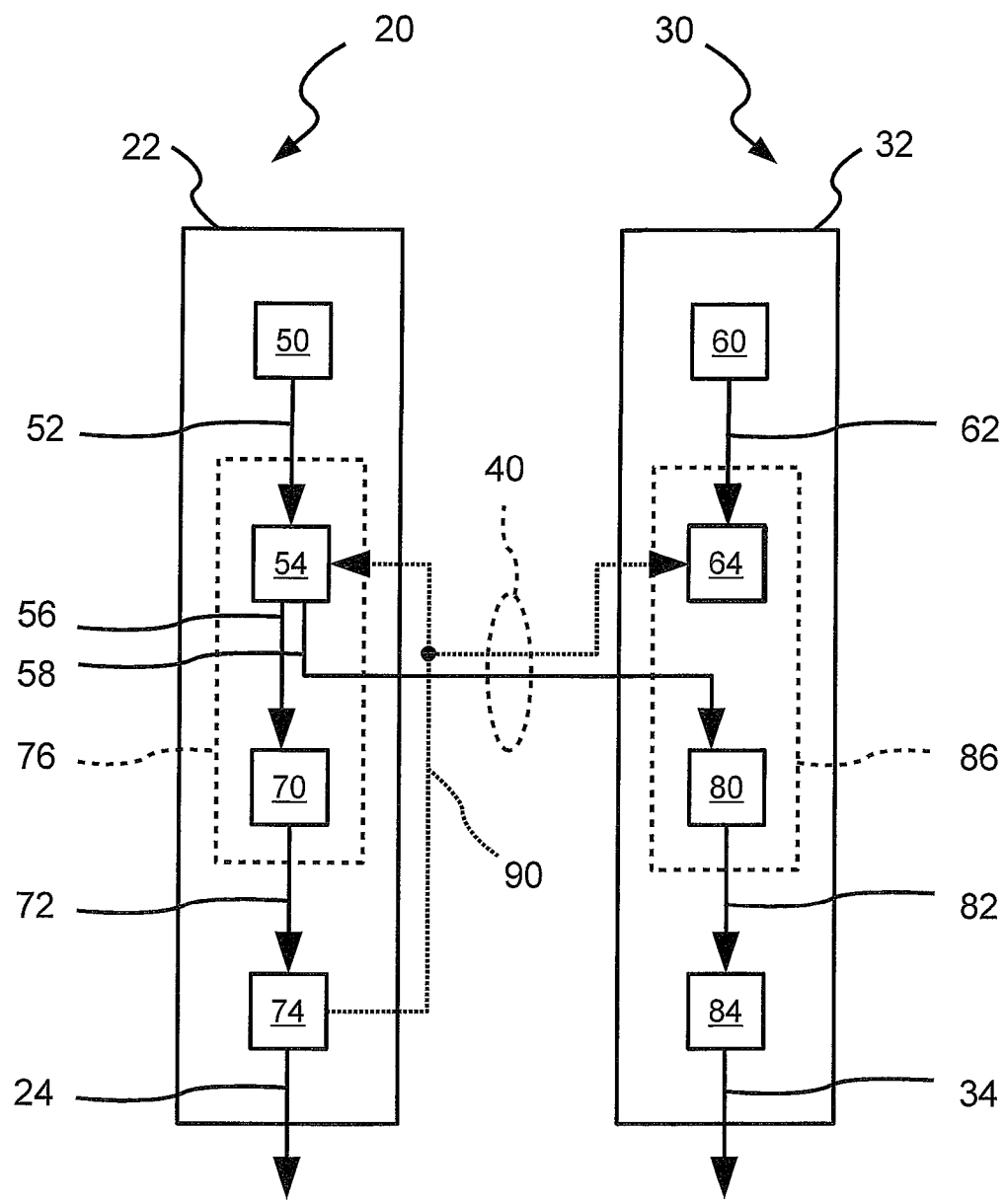

In FIG. 5, the two functional units 22 and 32 are shown in schematic form. In contrast to FIG. 2, FIG. 5 shows how the fourth component 74 generates a fault 90 and transmits said fault to the second components 54 and 64. The fault 90 does not consist of a complete failure of the fourth component 74 or of the associated electric motor 36 or the power electronics, but consists of reduced performance, which results for example from a reduced vehicle electrical system voltage that remains available to the actuator path 20 for applying the partial steering torque. In a different embodiment, the reduced performance can be notified because of a detected increased temperature in the form of the fault 90 of the second components 54 and 64. The components 54 and 64 calculate the respective partial assist torques depending on the reduced performance, which for example is transmitted by means of the fault 90 in the form of a percentage. In the present case, the distributor unit 76 is activated as the master and depending on the fault 90 produces a reduced first partial assist torque 56 and an increased second partial assist torque 58. The second partial assist torque 58 is increased so that the reduction in the first partial assist torque 56 can be compensated by the second actuator path 30.

Of course, similarly to the fault 90 of the fourth component 84, a corresponding fault can be generated and said reduced performance of the second actuator path 30 can be transmitted to the second components 54 and 64. If the second component 54, 64 determines that the sum of the two partial assist torques 56 and 58 is not sufficient for applying the total assist torque 52, then both one of the partial assist torques 56 or 58 or both partial assist torques 56 and 58 can be increased at least briefly. Thus, the second component 54, 64 determines that the performance of the power steering system 4 reduces below a minimum limit and the performance of the individual actuator paths 20, 30 can be raised at least briefly above a prioritized weighting, so that a minimum assist torque, which can also lie below the demanded total assist torque 52, is always provided. The prioritized weighting relates to the type of the fault 90. There is thus a first type of fault, with which a brief increase of the power is not possible. Said first type of fault consists for example of a vehicle electrical system voltage below an emergency operating threshold level. By contrast, a second type of fault enables an increase of the power in emergency situations or over short time periods. Said second type of fault consists for example of a raised temperature of the actuator path or a reduction of the vehicle electrical system voltage below a safety threshold value and a reduced assist torque of the respective actuator path because of the second type of fault. The emergency operating threshold value for the vehicle electrical system voltage is lower than the safety threshold value. If the first actuator path 20 has the first type of fault and the second actuator path 30 has the second type of fault for example, then the second actuator path 30 cannot compensate the assist torque that is not provided by the first actuator path 20 by increasing the assist torque in the event of an emergency or for short periods.

Figure 6:
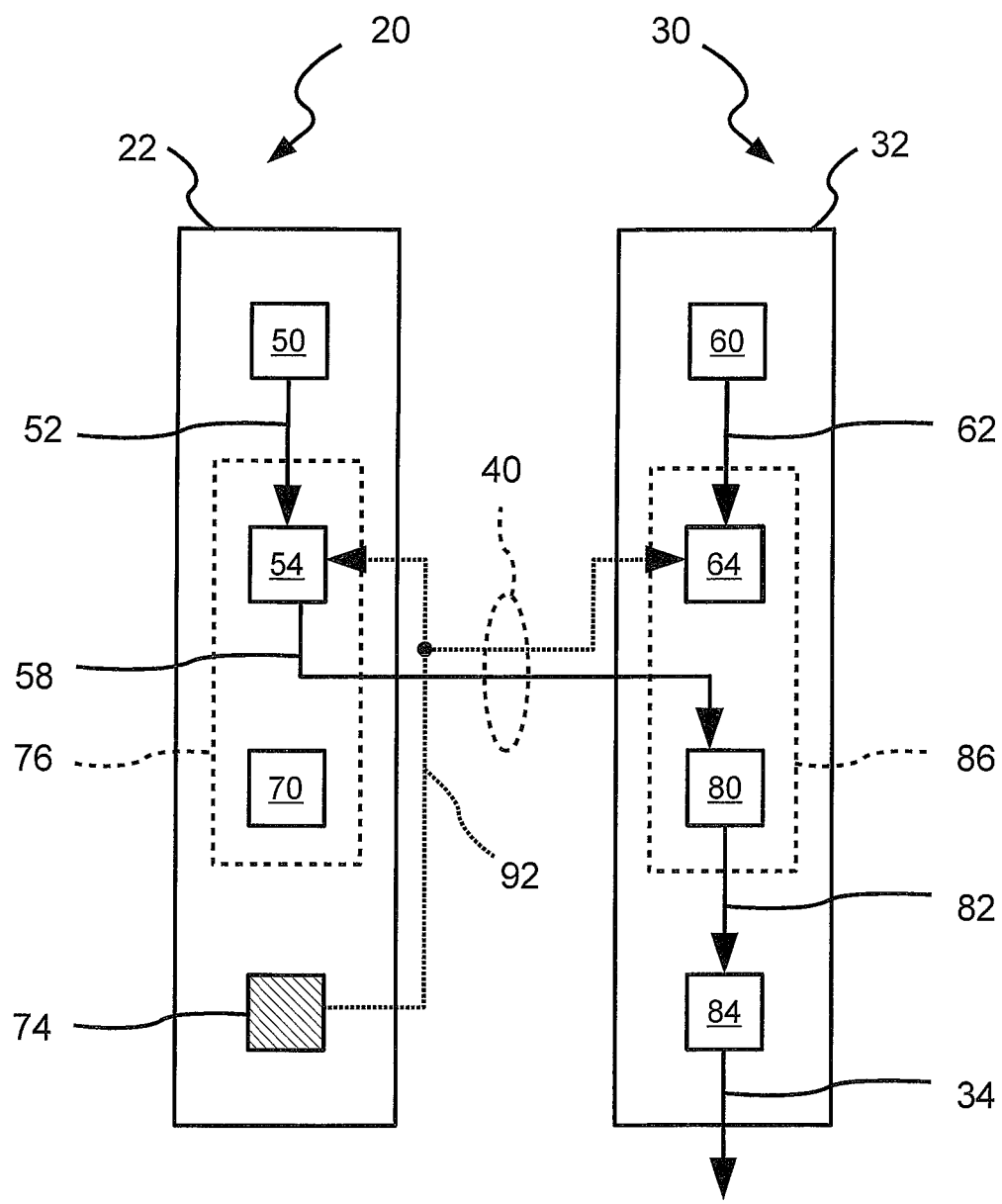

In FIG. 6, the two functional units 22 and 32 are shown in schematic form. In contrast to FIG. 5, a fault 92 is determined that consists of a functional failure of the fourth component 74. Said fault 92 is made known to the second component 54, 64. In the present case, the unit 76 is active as the master and thus determines the second partial assist torque 58 depending on the fault 92, so that the failure of the fourth component 74 or of the electric motor 26 or of the associated power electronics is compensated by means of the partial assist torque 58. The fault 92 can also consist of the reduced performance of the actuator path 20 mentioned in FIG. 5, wherein the performance has fallen below a threshold value. Furthermore, the performance of the actuator 30 can be fed to the second component 54 or 64 in order to determine whether the desired partial assist torque 58 can still be produced by means of the second actuator path 30.

Advantageously, the reliability of the overall system is increased. As shown in FIG. 6, the first actuator path is selected as the master for generating the second partial assist torque 58, although the application of an assist torque by said path is no longer possible. Nevertheless, the components 50 and 54 can be used, which for example can result in an assist torque still being able to be provided in the event of a failure of the components 60 and 64.

The invention claimed is:

1. A method for operating a steering system of a motor vehicle with a power steering system including a plurality of actuator paths for applying a respective plurality of partial assist torques which combine for an applied total assist torque to a steering gearbox, each of the plurality of actuator paths including a respective functional unit and a respective motor, the method comprising:
   activating a first of the plurality of actuator paths as master and activating a second of the plurality of actuator paths as slave;
   determining a determined total assist torque in each of the plurality of actuator paths;
   determining partial assist torques for all actuator paths in each of the plurality of actuator paths; and
   determining a first fault relating to a component that is required for determination of the partial assist torques in the first of the plurality of actuator paths that is activated as master;
   activating the first of the plurality of actuator paths previously activated as master as slave when the first fault is present;
   activating the second of the plurality actuator paths previously activated as slave as master when the first fault is present; and
   receiving the associated partial assist torque by each of the plurality of actuator paths activated as slave from the plurality of actuator paths that is activated as master.

2. The method as claimed in claim 1, further comprising:
   determining a second fault relating to a component that is required for applying the partial assist torque to the steering gearbox in the actuator path; and
   using the second fault when determining the partial assist torques.

3. The method as claimed in claim 2, wherein determining partial assist torques further comprises:
   determining the partial assist torque for the actuator path of the plurality of actuator paths in which the second fault has occurred as zero if the second fault consists of a failure of the component.

4. The method as claimed in claim 2, wherein determining partial assist torques further comprises:
   reducing the partial assist torque for the actuator path of the plurality of actuator paths in which the second fault has occurred if the second fault consists of reduced performance of the actuator path of the plurality of actuator paths in which the second fault has occurred.

5. The method as claimed in claim 4, wherein determining partial assist torques further comprises:
   increasing the partial assist torque of an actuator path of the plurality of actuator paths which is not affected by the second fault for compensation of the reduction of the partial assist torque of the actuator path of the plurality of actuator paths that is affected by the second fault.

6. A steering system of a motor vehicle with a power steering system comprising:
   a steering gearbox;
   a plurality of actuator paths configured to apply a respective plurality of partial assist torques which combine for an applied total assist torque to the steering gearbox, each of the plurality of actuator paths including a respective functional unit and a respective motor; and a control unit configured to operate the steering system by implementing a method, the method including:
   activating a first of the plurality of actuator paths as master and activating a second of the plurality of actuator paths as slave;
   determining a determined total assist torque in each of the plurality of actuator paths;
   determining partial assist torques for each of the plurality of actuator paths in each of the plurality of actuator paths;
   determining a fault relating to a component that is required for determination of the partial assist torques in the first of the plurality of actuator paths activated as master;
   activating the first of the plurality of actuator paths previously activated as master as slave when the fault is present;
   activating the second of the plurality actuator paths previously activated as slave as master when the fault is present; and
   receiving an associated determined partial assist torque by each of the plurality of actuator paths that is not activated as master from the plurality of actuator paths that is activated as master.

* * * * *